United States Patent
Hamdan et al.

(10) Patent No.: US 11,919,476 B1
(45) Date of Patent: Mar. 5, 2024

(54) VEHICLE KEY FOB MANAGEMENT

(71) Applicant: Ford Global Technologies, LLC, Dearborn, MI (US)

(72) Inventors: Muhannad Hamdan, Canton, MI (US); John Robert Van Wiemeersch, Novi, MI (US); Mahmoud Y. Ghannam, Canton, MI (US); Bradford S. Bondy, St. Clair Shores, MI (US); Christian Wegner, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/936,979

(22) Filed: Sep. 30, 2022

(51) Int. Cl.
| | |
|---|---|
| *B60R 25/102* | (2013.01) |
| *B60R 25/01* | (2013.01) |
| *B60R 25/10* | (2013.01) |
| *B60R 25/24* | (2013.01) |
| *B60R 25/31* | (2013.01) |
| *B60R 25/33* | (2013.01) |
| *G07C 9/00* | (2020.01) |

(52) U.S. Cl.
CPC ............ *B60R 25/102* (2013.01); *B60R 25/01* (2013.01); *B60R 25/24* (2013.01); *B60R 25/31* (2013.01); *B60R 25/33* (2013.01); *G07C 9/00309* (2013.01); *B60R 2025/1016* (2013.01); *B60R 2325/20* (2013.01); *G07C 2009/00769* (2013.01); *G07C 2009/00984* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 9,374,135 | B2 | 6/2016 | Fleming et al. |
| 9,715,816 | B1 | 7/2017 | Adler et al. |
| 10,140,838 | B2 | 11/2018 | Talty et al. |
| 10,255,791 | B2 | 4/2019 | Wilkinson et al. |
| 10,462,611 | B1 | 10/2019 | Klinkner et al. |
| 10,645,534 | B1 | 5/2020 | Klinkner et al. |
| 10,991,229 | B2 | 4/2021 | Doxey et al. |
| 2006/0186988 | A1* | 8/2006 | Proefke ................... B60R 25/24 340/5.21 |
| 2015/0161832 | A1* | 6/2015 | Esselink ................. B60R 25/24 340/5.22 |
| 2016/0140649 | A1* | 5/2016 | Kleve ................... H04W 12/06 705/307 |

OTHER PUBLICATIONS

Bouchard, "How to create a reminder that alerts you when getting in or out of your car", https://www.idownloadblog.com/2016/09/05/how-to-create-a-reminder-that-alerts-you-when-getting-in-or-out-of-your-car/.
Ravenscraft, "How to Get Notified When You Leave Your Keys or Wallet Behind with Trackr", https://www.howtogeek.com/310829/how-to-get-notified-when-you-leave-your-keys-or-wallet-behind-with-trackr/.

* cited by examiner

*Primary Examiner* — Carlos Garcia
(74) *Attorney, Agent, or Firm* — Frank Lollo; Bejin Bieneman PLC

(57) ABSTRACT

Upon detecting that a vehicle is parked, based on data from at least one of a sensor and a component in the vehicle, determine a location of the vehicle. Upon detecting that a vehicle operator has exited the vehicle, based on data from at least one of a sensor and a component in the vehicle, determine if the key fob is in the vehicle. Upon detecting that the key fob is in the vehicle, and based on the location of the vehicle, schedule a message to a user device.

19 Claims, 7 Drawing Sheets

VEHICLE KEY FOB MANAGEMENT

BACKGROUND

Components in modern vehicles can be accessed or activated by electronic devices as an alternative to or in addition to a physical key fob. For example, a vehicle computer can detect the presence of a transmitter, such as provided in a key fob, and actuate the component(s) in the vehicle.

DETAILED DESCRIPTION

Figure 1:
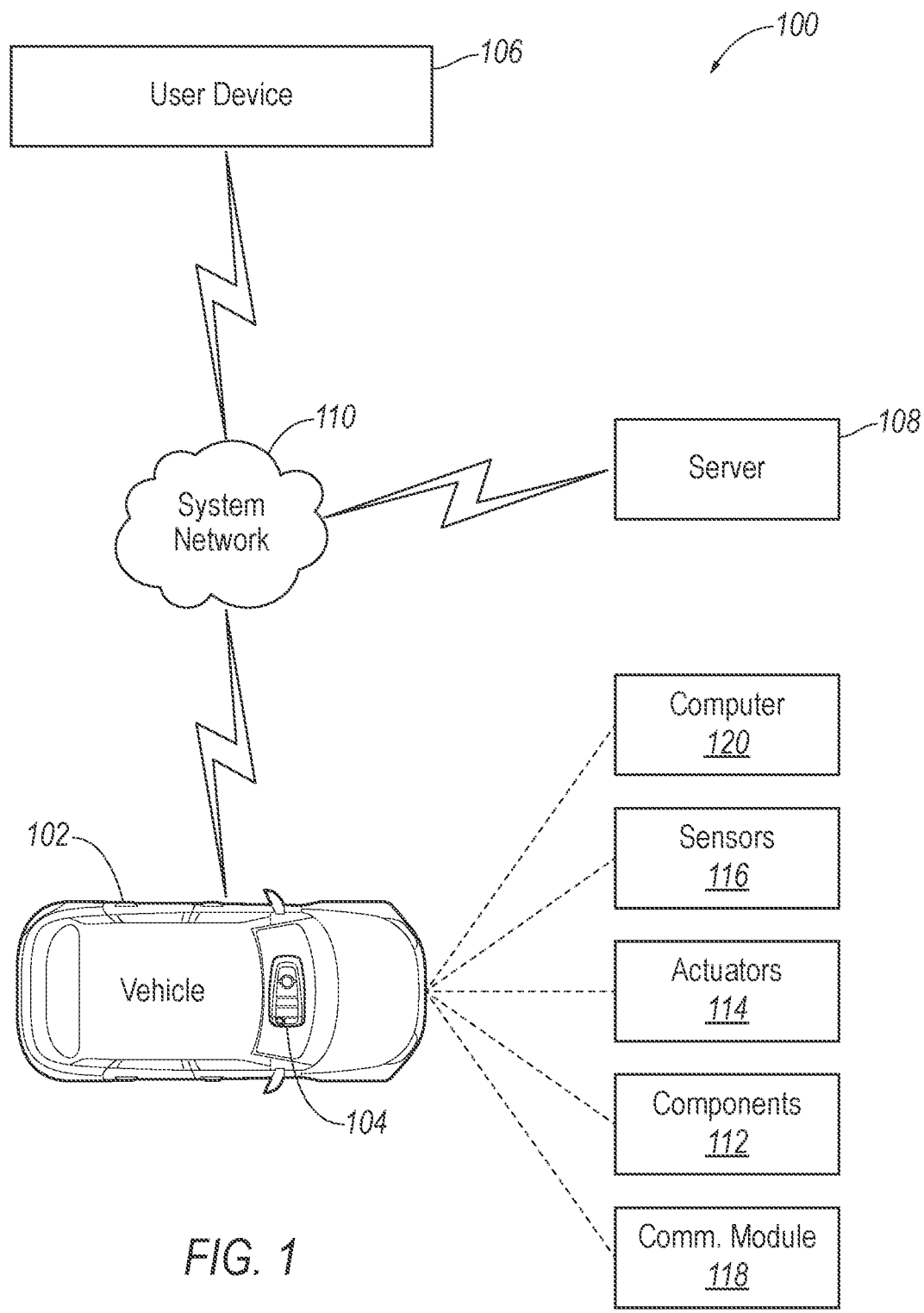
FIG. 1 is a block diagram illustrating an example control system for a vehicle.

As described herein, a vehicle status system may send to a portable user device a message of a vehicle key fob being left in a vehicle. A key fob herein means any suitable portable electronic device including a transceiver that can communicate with a vehicle computer, typically within a relatively short range and a high frequency band. The timing of sending the message and whether to send a message at all may be based on the location of the vehicle. Such location-specific control of the message may avoid sending unnecessary messages to the user device, conserving bandwidth and/or computing resources. For example, if the vehicle is parked in a first type of location such as an approved location, such as a known garage, there may be no message sent. If the vehicle is parked in a second type of location, such as in a wilderness location that is not approved but that is categorized as possibly appropriate for leaving a key fob in a vehicle, the vehicle may not send a message while identified persons remain within a sensing distance. However, when the vehicle is parked in the second type of location, and unidentified persons are detected within the sensing distance, the system may send the message to the vehicle operator's user device. If the vehicle is parked in another type of location, for example a third type of location in an area categorized as a commercial area, the message may be sent with higher priority (and therefore possibly sooner) than a message when the vehicle is in a first or second type location.

Advantageously, as described herein, a computing device comprises a processor and a memory. The memory of the status system stores instructions executable by the processor such that the computer is programmed to execute such instructions. Such instructions may include the following. Upon detecting that a vehicle is parked, based on data from at least one of a sensor and a component in the vehicle, a location of the vehicle is determined. Upon detecting that a vehicle operator has exited the vehicle, based on data from at least one of a sensor and a component in the vehicle, it is determined if a key fob is in the vehicle. Upon detecting that the key fob is in the vehicle, and based on the location of the vehicle, a message to a user device is scheduled.

The computing device may be further programmed to consider additional factors prior to scheduling the sending any message or messages to the user device as per the below clauses. To the extent that such features are not mutually exclusive, they may be combined with each other.

The location in which the vehicle is parked may be established as one of a secure location, an isolated location, and a public location.

Scheduling the message may include determining not to send the message based upon a determined type of location.

When the location is an isolated location, the computing device determines persons within a recognition range as being one of an identified person and an unidentified person. When only identified persons are detected, the determination of persons with the recognition range is repeated after a first period of time. When an unidentified person is detected, the message is scheduled and sent to the user device.

When the location is a public location, the message is scheduled and sent to the user device.

The computing device determines whether a door lock is in a locked condition or in an unlocked condition.

The computing device determines whether a vehicle door is in an ajar condition or in a fully closed condition.

When the location of the vehicle is in an isolated location and the vehicle is in a power-on condition, the message to the user device is sent after a second period of time after an event.

When the location of the vehicle is in the isolated location and the vehicle is in a power-off condition, the message to the user device is sent after a third period of time after detection of an event, with the third period of time being greater than the second period of time.

When the location of the vehicle is an isolated location and an unidentified person is detected, the message is sent to the user device within a fourth period of time from such detection.

When the location of the vehicle is a public location and the vehicle is in a power-on condition, the message is sent to the user device within a fifth period of time after detection of an event.

When the location of the vehicle is a public location and the vehicle is in a power-off condition, the message is sent to the user device within a sixth period of time after detection of the event.

The computing device continuously monitors sensors for errors and when an error is detected, it immediately sends the message to the user device.

A method of responding to a detection of a vehicle key fob in a parked vehicle is set forth below.

A method of responding to a detection of a vehicle key fob in a parked vehicle includes a plurality of steps including the following. Upon detecting that a vehicle is parked, based on data from at least one of a sensor and a component in the vehicle, a location of the vehicle is determined. Upon detecting that a vehicle operator has exited the vehicle, based on data from at least one of a sensor and a component in the vehicle, whether a key fob is in the vehicle is determined. Upon detecting that the key fob is in the vehicle, and based on the location of the vehicle, a message to a user device is scheduled.

Additional steps that may be included are set forth below. Such additional steps may be combined with each other to the extent that they are not mutually exclusive.

Scheduling the message includes determining not to send the message upon determining that the location is a secure location.

The location in which the vehicle is parked is determined to be a type of location that is one of a secure location, an isolated location, or a public location.

When the location is an isolated location, a determination is made of persons within a recognition range as being one of an identified person and an unidentified person. When only identified persons are detected, the determination of persons with the recognition range is repeated after a first period of time. When an unidentified person is detected, the message is scheduled and sent to the user device.

A determination is made as to whether a door lock is in a locked condition or in an unlocked condition.

When the location of the vehicle is in an isolated location and the vehicle is in a power-on condition, the message to the user device is sent after a second period of time after an event.

When the location of the vehicle is in the isolated location and the vehicle is in a power-off condition, the message to the user device is sent after a third period of time after detection of the event, with the third period of time being greater than the second period of time.

With reference to FIGS. 1-9, a system for sending a message to a vehicle operator's user device that a vehicle key fob remains in the vehicle is disclosed.

With particular reference to FIG. 1, an example vehicle status system 100 can include the following example elements: a vehicle 102, a vehicle key fob 104, a user device 106, a server 108, and a system network 110.

The vehicle 102 includes a plurality of vehicle components 112, a plurality of vehicle actuators 114, a plurality of vehicle sensors 116, a vehicle communications module 118, and a vehicle computer 120.

In the context of the present disclosure, a vehicle component 112 is one or more hardware components adapted to perform a mechanical or electro-mechanical function or operation—such as moving the vehicle 102, slowing or stopping the vehicle 102, steering the vehicle 102, etc. Non-limiting examples of components 112 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, a door lock component, etc.

The vehicle actuators 114 are implemented via circuits, chips, or other electronic and or mechanical components that can actuate various vehicle subsystems in accordance with appropriate control signals as is known. The actuators 114 may be used to control components 112, including brake components for braking, propulsion components for acceleration, steering components for steering of a vehicle 102, and door lock components for locking vehicle doors.

Vehicle sensors 116 may include a variety of devices such as are known to provide data to the vehicle computer 120. For example, the sensors 116 may include Light Detection And Ranging (LIDAR) sensor 116(s), etc., disposed on a top of the vehicle 102, behind a vehicle 102 front windshield, around the vehicle 102, etc., that provide relative locations, sizes, and shapes of objects, including people, surrounding the vehicle 102. As another example, one or more radar sensors 116 fixed to bumpers of the vehicle 102 may provide data to provide locations of the objects, second vehicles, etc., relative to the location of the vehicle 102. The sensors 116 may further alternatively or additionally, for example, include cameras 116, e.g., front view, side view, 360° view, etc., providing images from an area surrounding the vehicle 102. As another example, the vehicle 102 can include one or more sensors 116, e.g., cameras 116, mounted inside a cabin of the vehicle 102 and oriented to capture images of users, including a vehicle operator, in the vehicle 102 cabin. In the context of this disclosure, an object is a physical, i.e., material, item that has mass and that can be represented by physical phenomena (e.g., light or other electromagnetic waves, or sound, etc.) detectable by sensors 116. Other sensors 116 may include seat pressure sensors 116 able to sense the presence of a weight on a seat, door ajar sensors able to recognize when a door is in a door ajar condition, i.e., less than a fully closed condition, and a door lock sensor able to determine both when a door lock is in a locked mode and when the door lock in in an unlocked mode. Thus, the vehicle 102, and people, as well as other items including as discussed below, fall within the definition of "object" herein. Additional example sensors 116 may also include steering sensors, drive motor sensors, brake sensor, wheel speed sensors, and battery sensors.

The vehicle communication module 118 allows the vehicle computer 120 to communicate with a remote computer (not shown) of the server 108, and/or the user device 106, by way of example, a messaging or broadcast protocol such as Dedicated Short Range Communications (DSRC), Bluetooth® Low Energy (BLE), Ultra-Wideband (UWB), cellular, and/or other protocol that can support vehicle-to-vehicle, vehicle-to-structure, vehicle-to-cloud communications, or the like, and/or via the system network 110.

The vehicle computer 120 is a computing device that includes a processor and a memory such as are known. The memory includes one or more forms of computer-readable media, and stores instructions executable by the vehicle computer 120 for performing various operations, including as disclosed herein. The vehicle computer 120 can further include two or more computing devices operating in concert to carry out vehicle 102 operations including as described herein. Further, the vehicle computer 120 can be a generic computer with a processor and memory as described above and/or may include a dedicated electronic circuit including an ASIC (application-specific integrated circuit) that is manufactured for a particular operation, e.g., an ASIC for processing sensor 116 data and/or communicating the sensor 116 data. In another example, the vehicle computer 120 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 120.

The vehicle computer 120 may include or be communicatively coupled to, e.g., via a vehicle communication network such as a communications bus as described further below, more than one processor, e.g., included in electronic controller units (ECUs) or the like included in the vehicle 102 for monitoring and/or controlling various vehicle components 112, e.g., a transmission controller, a brake controller, a steering controller, etc. The vehicle computer 120 is generally arranged for communications on a vehicle communication network that can include a bus in the vehicle 102 such as a controller area network (CAN) or the like, and/or other wired and/or wireless mechanisms.

Via the vehicle 102 communication network, the vehicle computer 120 may transmit messages to various devices in the vehicle 102 and/or receive messages (e.g., CAN messages) from the various devices, e.g., sensors 116, actuators 114, ECUs, etc. Alternatively, or additionally, in cases where the vehicle computer 120 comprises a plurality of computing devices that may be associated with particular components and systems of the vehicle 102, the vehicle communication network may be used for communications between the computing devices which may be represented as the vehicle computer 120 in this disclosure. Further, as mentioned below, various controllers and/or sensors 116 may provide data to the vehicle computer 120 via the vehicle communication network.

The vehicle computer 120 is programmed to receive data from one or more sensors 116, e.g., substantially continuously, periodically, and/or when instructed by the remote computer of the server 108, etc. The data may, for example, include a location of the vehicle 102. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 102, a sign, a tree, a person, etc., relative to the vehicle 102. As one example, the data may be image data of the environment around the vehicle 102. In such an example, the image data may include one or more objects and/or markings, e.g., lane markings, on or along a road. Image data herein means digital image data, i.e., comprising pixels, typically with intensity and color values, that can be acquired by cameras 116. The sensors 116 can be mounted to any suitable location in or on the vehicle 102, e.g., on a vehicle 102 bumper, on a vehicle 102 roof, etc., to collect images of the environment around the vehicle 102.

In addition, the vehicle computer 120 may be configured for communicating via the vehicle communication module 118 and the system network 110 with devices outside of the vehicle 102, e.g., with the user device 106 and the server 108, using wireless communications (cellular and/or DSRC., etc.) or direct radio frequency communications. The communication module 118 could include one or more mechanisms, such as a transceiver, to facilitate such communication, and may employ any desired combination of wireless (e.g., cellular, wireless, satellite, microwave and radio frequency) communication mechanisms and any desired network topology (or topologies when a plurality of communication mechanisms are utilized). Exemplary communications provided via the communications module 118 include cellular, Bluetooth®, IEEE 802.11, Ultra-Wideband (UWB), Near Field Communication (NFC), dedicated short range communications (DSRC), and/or wide area networks (WAN), including the Internet, providing data communication services.

The remote server 108 can be a conventional computing device, i.e., including one or more processors and one or more memories, programmed to provide operations such as disclosed herein. Further, the remote server 108 can be accessed via the network 110, e.g., the Internet, a cellular network, and/or or some other wide area network, particular forms of which may be characterized as a cloud server 108.

The network 110 represents one or more mechanisms by which a vehicle computer 120 may communicate with remote computing devices, e.g., the remote computer of the server 108, another vehicle computer, etc. Accordingly, the network 110 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services).

An example user device 106 may be provided by a smartphone 106 or a purpose-specific wireless communication device incorporating a suitable vehicle control software application. The user device 106, like other elements of the vehicle status system 100, may include hardware suited to connecting to wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services).

Figure 2:
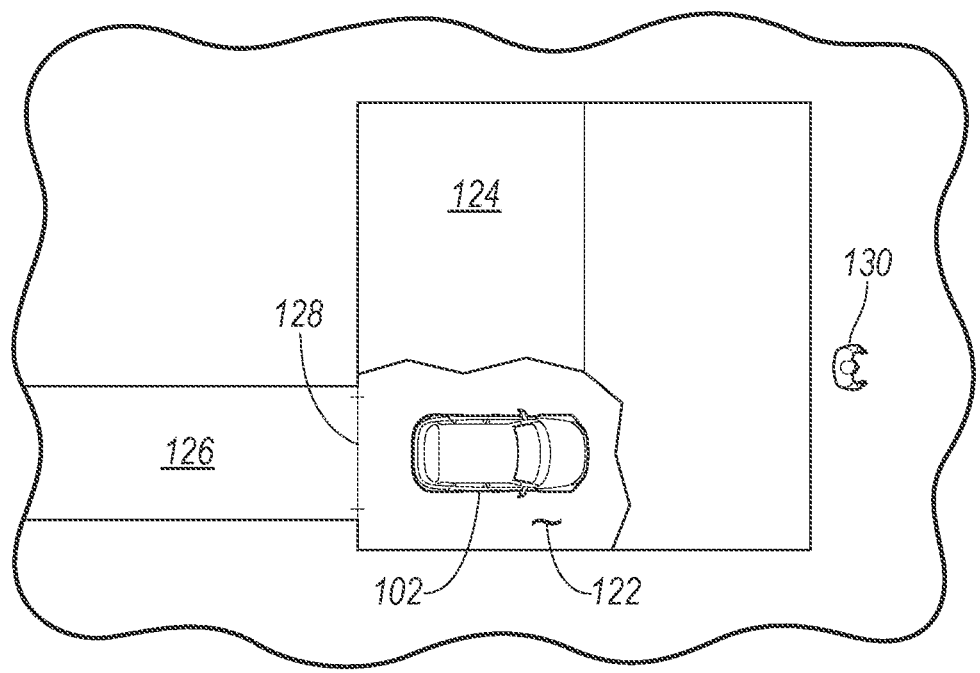
FIG. 2 is an aerial view of the vehicle in a first type of location.
Figure 3:
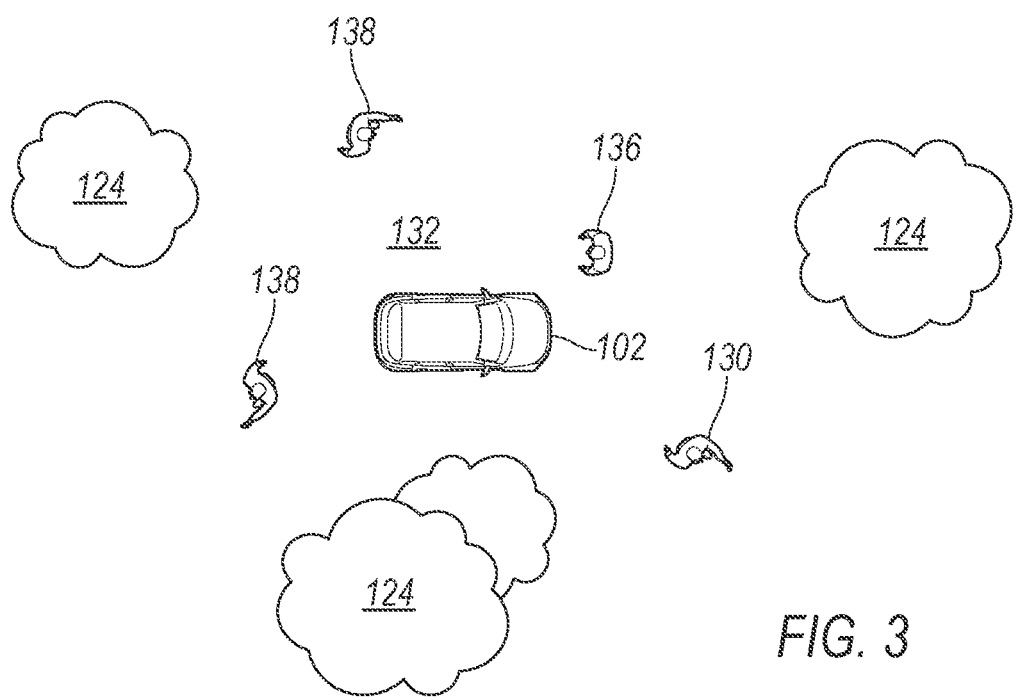
FIG. 3 is an aerial view of the vehicle in a second type of location.
Figure 4:
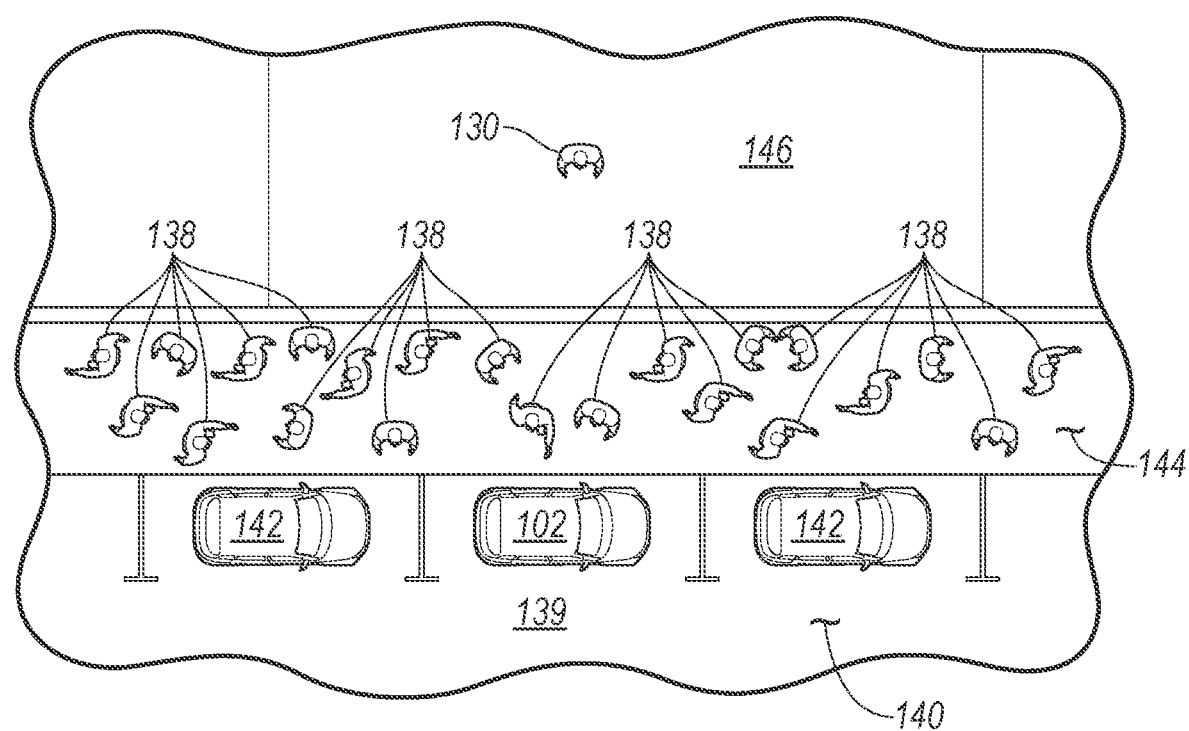
FIG. 4 is an aerial view of the vehicle in a third type of location.

The computer 120 can be programmed to respond differently to different types of locations in which the vehicle 102 may be parked. As mentioned above, the computer 120 can determine a type of a location from a plurality of stored types of location. A type of location in the present context means an identifier assigned to a location to indicate that the location has characteristics in common with other locations sharing the identifier, and differences from locations not sharing the identifier. Types of locations may be determined based on characteristics discussed further below, such as, in the illustrated examples, whether a location is determined to be one of secure, isolated, or public. Example determined types of locations may include a secure location that is a first type location 122 as illustrated in FIG. 2, an isolated location that is a second type location 132 as illustrated in FIG. 3, and a public location 139 that is a third type location, as illustrated in FIG. 4. The vehicle 102 may use the vehicle sensors 116 to distinguish between the types of locations at which the vehicle 102 may be parked. For example, the vehicle 102 can include a GPS sensor 116 that can indicate a vehicle 102 location. The computer 120 could include and/or access a memory storing data such as a map, lookup table, etc., indicating a type of the vehicle 102 location currently indicated by data from a GPS sensor 116.

An example first type location 122 that is specified to be a secure location for parking the vehicle 102 may include any of, by way of example and not limitation, a residential parking area 122, an office with a secured parking area (not shown), and any location that a vehicle operator may designate as secure. In the example of FIG. 2, the illustrated example first type location 122 is provided by a garage 122. While the illustrated example secured location 122 is shown as an attached garage 122, the first type location 122 may alternatively be in the form of, by way of example, a detached garage, a carport, or a parking pad. A type of location could be determined by proximity to, i.e., being within a predetermined distance of, an object. For example, a first type location 122 could be determined based on proximity to a building structure 124, such as a house, and/or a driveway 126.

The example first type location 122 may include an openable barrier 128, by way of example, a garage door 128 or a gate (not shown), disposed between the garage 122 and the driveway 126. The vehicle 102 may be programmed to, based on data from its sensors 116, determine when the barrier 128 is closed. A vehicle operator 130 may be nearby, as in a backyard or inside the structure 124.

An example isolated second type location 132 for parking the vehicle 102 may include, by way of example and not limitation, a low population density area. Examples of low density population areas include rural areas and forest areas. Such areas may be identified by vehicles based on the GPS data associated with the vehicle's location, and on supplementary data for that location, including localized building and population density. Similar to secure locations designated as first type locations, a vehicle operator 130 may designate a particular area as an isolated second type location 132. As illustrated in FIG. 3, an example isolated location 132 has no nearby permanent human-made structures. There are trees 124, the vehicle operator 130, and both identified persons 136, e.g., including a vehicle 102 operator, and unidentified persons 138 shown.

An exemplary third type location is a location is a public location 139 that is neither a first or second type location. Example third type locations for parking may include, by way of example and not limitation, any a shopping mall parking lot, a workplace parking lot, a city center parking lot, and street parking. FIG. 4 illustrates an example public location in a street parking setting. The vehicle 102 is parallel parked on a street 140 between two similarly parked vehicles 142. A sidewalk 144 extends between a row of shops 146 and the street 140. The operator 130 is shown as being in one of the shops 146. A large number of unidentified persons 138 are traversing the sidewalk 144 between the shop 146 and the vehicle 102.

The system 100 may be operated in the following manner.

The vehicle computer 120 can receive data from sensors 116 and/or from the server 108. The vehicle computer 120 may also receive data from the user device 106. The vehicle computer 120 is programmed to determine whether the vehicle is in the secure location 122, the isolated location 132, or the public location 139. The vehicle computer is programmed to detect a trigger event, i.e., an event that when detected in the vehicle computer 120 causes the vehicle computer 120 schedule a message to a user device 106. Examples of trigger events include the operator 130 leaving the vehicle, or the doors being lock after vehicle power has been terminated. The vehicle computer 120 is also programmed to detect that the key fob 104 has been left inside the vehicle 102 after detection of the trigger event. The vehicle computer 120 is programmed to schedule a message to the user device 106 after, i.e., upon, detecting the trigger event and detecting the key fob 104 being in the vehicle 102. The scheduling and the content of the message may depend on the location of the vehicle, e.g., based on a type of the location.

In the first type location of FIG. 2, an example secure location 122, the vehicle 102 is parked, the vehicle operator 130 has left the vehicle 102, and also left the key fob 104 (not shown in FIG. 2) in the vehicle 102. As this is done by many vehicle operators intentionally, a message is scheduled to not be sent by the vehicle computer 120 to the user device 106. A vehicle status summary, available to the vehicle operator 130 via the user device 106, may be updated to indicate the presence of the key fob 104 in the vehicle 102.

In the isolated second type location 132 of FIG. 3, the vehicle 102 is parked, the vehicle operator 130 has left the vehicle 102, and also left the key fob 104 in the vehicle 102. In this situation, the scheduling of a message to be sent to the user device 106 can depend upon the vehicle computer 120 acquiring additional data. For example, scheduling a message to the user device 106 can be deferred when the vehicle 102 is in a second type location 132. While the vehicle computer 120 determines whether persons within a scanning range of the vehicle are identified persons 136 or unidentified persons 138. An identified person 136 may include the vehicle operator 130 and any occupant of the vehicle. Any suitable biometric technique can be used to identify persons 136, for example. Biometric techniques used to identify persons may include, by way of example and not limitation, facial recognition, voice identification, and gait analysis. A scanning range suitable for biometric identification varies with the capabilities of the available sensors 116. Sensors 116 including cameras 116 providing a 360 view of the vehicle's surroundings may be employed, with a new, i.e., repeat, scan of the surroundings being made at a regular, predetermined frequency. Such a frequency, or a first period of time may be at any suitable frequency, with every 5 seconds being one example. Deferral of the message continues while no unidentified persons 138 detected. When an unidentified person 138 is detected, the message is scheduled to be sent by the vehicle computer 120 to the user device 106. The message may include information including whether any of the doors of the vehicle 102 are unlocked, and whether any of the doors are ajar.

When the vehicle 102 is parked in the isolated location 132, and the message is scheduled to be sent, the timing of when the message is sent may be varied with the circumstances. For example, when the vehicle is in a power-on condition, and an event occurs, such as an unidentified person 138 being detected, the message may be sent after a second period of time from such event occurring being made. An alternative event may be the exiting of the vehicle operator from the vehicle 102. The second period may be as little as, by way of example, zero seconds, meaning that, as promptly as it is able, the vehicle computer 120 sends the message to the user device 106 advising of the key fob 104 being left in the vehicle 102. The message may additionally include the information that an unidentified person 138 has been detected, and that the vehicle 102 is in the power-on condition. The power-on condition is in effect when an engine of the vehicle is running, or the vehicle is otherwise ready to be driven, or, in the case of an electric vehicle, the vehicle computer and cabin entertainment and environmental systems are energized and ready for operating, Further, when the vehicle is left in a power-off condition, as when the engine is not running, or the vehicle is not otherwise ready to be driven, and an event occurs, such as an unidentified person 138 being detected, or the vehicle operator exiting the vehicle 102, the message may be sent after a third period of time from such detection being made. The third period may be longer, i.e., greater, than the second period, as the vehicle in the power-off condition may attract less attention than the vehicle in the power-on condition. An example length of the third period may be three minutes. If the vehicle computer 120 detects the unidentified person 138 getting closer to the vehicle 102, the third period may be shortened or reduced to zero. The vehicle 102 may also be programmed to lock the doors when the unidentified person 138 gets to within a predetermined distance of the vehicle, an example distance being two meters. Such door locking may be executed independent of whether the vehicle is in a power-on or power-off condition.

When the vehicle is parked in the isolated second type location 132, and no unidentified persons 138 are detected, the vehicle computer 120 may still send the message to the user device 106 after a fourth period of time when the power is on and a fifth period of time when the power is off, with the time periods initiating with an event such as the exit of the vehicle operator 130 from the vehicle. The fourth period is shorter than the fifth period, as the stored vehicle energy (engine fuel, battery power) is typically diminished, that could, when leaving the key fob 104 in the vehicle and the vehicle in the power-on mode is unintentional, consuming power that could otherwise be conserved. Of course, should an unidentified person 138 be detected, the vehicle computer 120 would send the message in accord with the preceding guidance.

When the vehicle 102 is parked in the public location 139, it is expected that unidentified persons 138 may be proximate to the vehicle 102. The vehicle computer 120 may still distinguish between power-on and power-off conditions for sending a message to the user device 106. When the vehicle 102 is in the power-on condition, the message may be sent within a sixth period of time from the driver exiting the vehicle. When the vehicle 102 in the power-off condition, the message may be sent within a seventh period of time from the driver exiting the vehicle 102, with the seventh period being longer, i.e., greater, than the sixth period, for the reasons suggested above.

The vehicle computer 120 may also be programmed to send a message to the user device 106 immediately upon determining that one or more sensors 116 of the status system are not properly functioning. More specifically, the computer 120 may continuously monitor the sensors 116 for errors and when an error is detected, it immediately sends the message to the user device 106.

Any suitable techniques may be used to interpret sensor 116 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 116 data, e.g., an image, and then provide as output, for each of one or more respective regions of interest in the image, an identification of the vehicle operator or another person or an indication that the vehicle operator or other person is present in the respective region of interest. Further, a coordinate system (e.g., polar or cartesian) applied to an area proximate to the vehicle 102 can be applied to specify locations and/or areas (e.g., according to the vehicle 102 coordinate system, translated to global latitude and longitude geo-coordinates, etc.) of a user identified from sensor 116 data. Yet further, the vehicle computer 120 could employ various techniques for fusing (i.e., incorporating into a common coordinate system or frame of reference) data from different sensors 116 and/or types of sensors 116, e.g., LIDAR, radar, and/or optical camera data.

The vehicle computer 120 can actuate one or more components 112 to control vehicle operation. For example, the vehicle computer 120 can actuate a brake component 112 to stop the vehicle 102. As another example, the vehicle computer 120 can actuate a propulsion component 112 to operate the vehicle 102.

Figure 5:
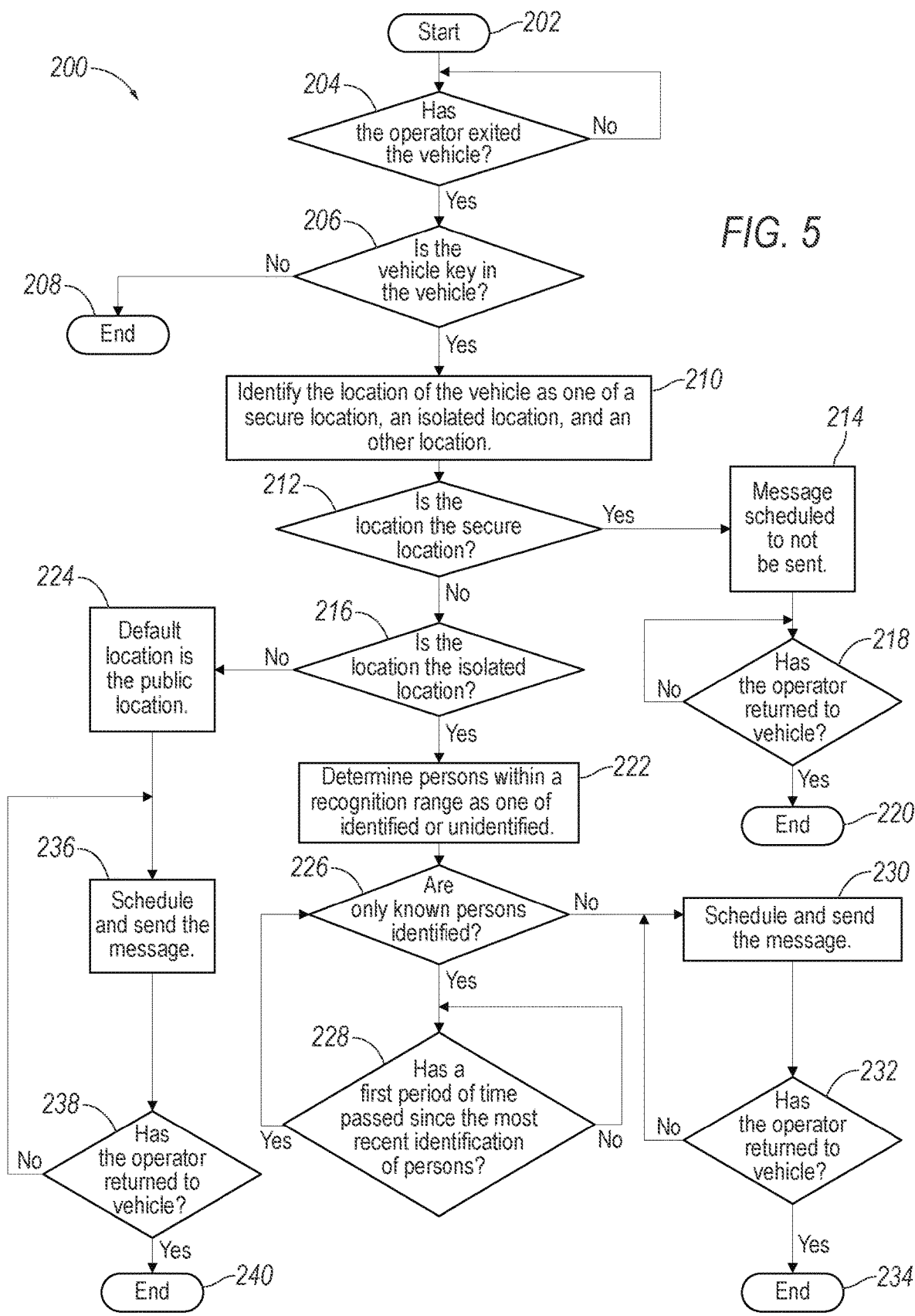
FIG. 5 is a flow chart of an example process to notify an operator of the presence of a key fob in the vehicle.

FIG. 5 is a diagram of an example process 200 executed in the vehicle computer 120 according to program instructions stored in a memory thereof for messaging the user device 106 that the key fob 104 has been left in the vehicle 102 in a manner intended to minimize unnecessarily annoying the vehicle operator 130. Process 200 includes multiple blocks that can be executed in the illustrated order. Process 200 could alternatively or additionally include fewer blocks or can include the blocks executed in different orders.

Process 200 begins in a start block 202. In the block 202, the computing device 120, the vehicle computer 120, receives data from one or more vehicle sensors 116 via the vehicle network, from the remote server 108 via the network 110, and/or from the user device 106 via the network 110 as discussed above. The process 200 continues in a decision block 204.

In the block 204, the vehicle computer 120, based on data from the vehicle sensors 116, including for example, the inwardly facing cameras, and/or seat pressure sensors, determines whether or not the vehicle operator 130 has exited the vehicle 102. When the vehicle operator is determined to be in the vehicle 102, the process 200 continues to check on whether the vehicle operator 130 has exited the vehicle. When the vehicle operator is determined by the computer 120 to have exited the vehicle 102, the process 200 continues in a decision block 206.

In the block 206, the vehicle computer 120, based on data from vehicle sensors 116, including for example, a Bluetooth sensor or an RFID sensor, assesses whether or not the vehicle key fob 104 is present within the vehicle 102. When the key fob 104 is in the vehicle 102, the process 200 continues in a block 210. Otherwise, the process 200 continues in an end block 208, where the process 200 ends.

In the block 210, a current location of the vehicle 102 is determined based on data from at least the vehicle sensors 116 and set as the first location. The current location of the vehicle 102 is identified as one of the first type location 122, the isolated location 132, and the public location 139. The process 200 continues in a block 212.

In the block 212, based on the data from the block 210, a determination is made as to whether the location of the vehicle 102 is the first type location 122. When the vehicle 102 is in the first type location 122, the process 200 continues to a block 214. When the vehicle is not in the first type location 122, the process 200 continues to a block 216.

In the block 214, a message to the user device 106 is scheduled to not be sent. The process continues to a block 218.

In the block 218, the process determines if the vehicle operator has returned to the vehicle 102. If the vehicle operator 130 has not returned to the vehicle 102, then the process loops and continues to check for the operator's return. When the vehicle operator 130 has returned to the vehicle 102, the process continues to a block 220.

In the block 220, the process 200 ends.

In the block 216, based on the data from the block 210, a determination is made as to whether the location of the vehicle 102 is the isolated location 132. When the vehicle 102 is in the isolated location 132, the process 200 continues to a block 222. When the vehicle is not in the isolated location 132, the process 200 continues to a block 224.

In the block 222, a determination is made of persons within a recognition range of the vehicle sensors 116 as being one of identified persons 136 or unidentified persons 138. The process 200 then continues to a block 226.

In the block 226, when only identified persons 136 are detected, the process continues to a block 228. Otherwise, the process continues to a block 230.

In the block 228, when a first period of time has lapsed since the most recent determination is made of persons with the recognition range, the process loops back to the block 226. Otherwise the block 228 loops back on itself.

In the block 230, the sending of the message is scheduled. The process 200 continues to a block 232.

The block 232 determines whether the operator 130 has returned to the vehicle 102. When the operator has not returned to the vehicle 102, the process loops back to the block 230. When the operator has returned to the vehicle 102, the process 200 continues to a block 234.

In the block 234, the process 200 ends.

In the block 224, the location of the vehicle 102 is determined by default to be the public location 139. The process 200 continues to a block 236.

In the block 236, the message is scheduled for sending and sent. The process then continues to a block 238.

In the block 238, it is determined whether or not the operator 130 has returned to the vehicle 102. If the operator has not returned to the vehicle, the process 200 loops back to the block 236 to reschedule and resend the message to the operator 130. When the operator has returned, the process 200 continues to a block 240.

In the block 240, the process 200 ends.

Figure 6:
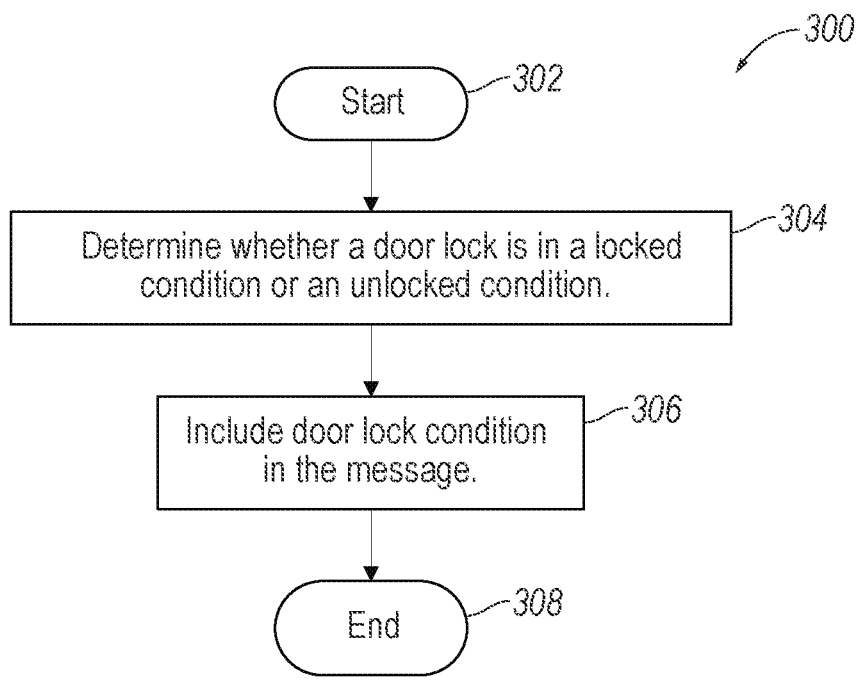
FIG. 6 is a flow chart of a supplementary process for advising of a status of a door lock.

FIG. 6 is a diagram of an example supplemental process 300 to the process 200 that may be executed at any time before the message is sent out. The process 300 is started in a block 302, and then continues to a block 304.

In the block 304, it is determined whether a door lock in in a locked condition or an unlocked condition. The process 300 then continues in a block 306.

In the block 306, the door lock condition is included in the message. The process 300 continues to a block 308.

In the block 308, the process 300 ends.

Figure 7:
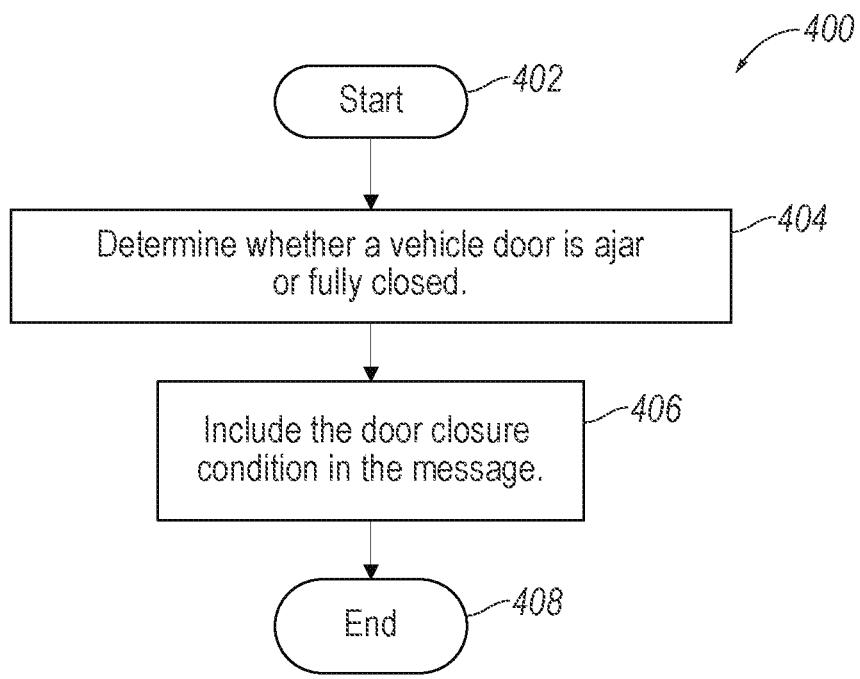
FIG. 7 is a flow chart of a supplementary process for advising of a status of a door position.

FIG. 7 is a diagram of an example supplemental process 400 to the process 200 that may be executed at any time before the message is sent. The process 400 is started in a block 402, and then continues to a block 404.

In the block 404, it is determined whether a door is ajar or is fully closed. The process 400 then continues in a block 406.

In the block 406, the door ajar/door closed condition is included in the message. The process 400 continues to a block 408.

In the block 408, the process 400 ends.

Figure 8:
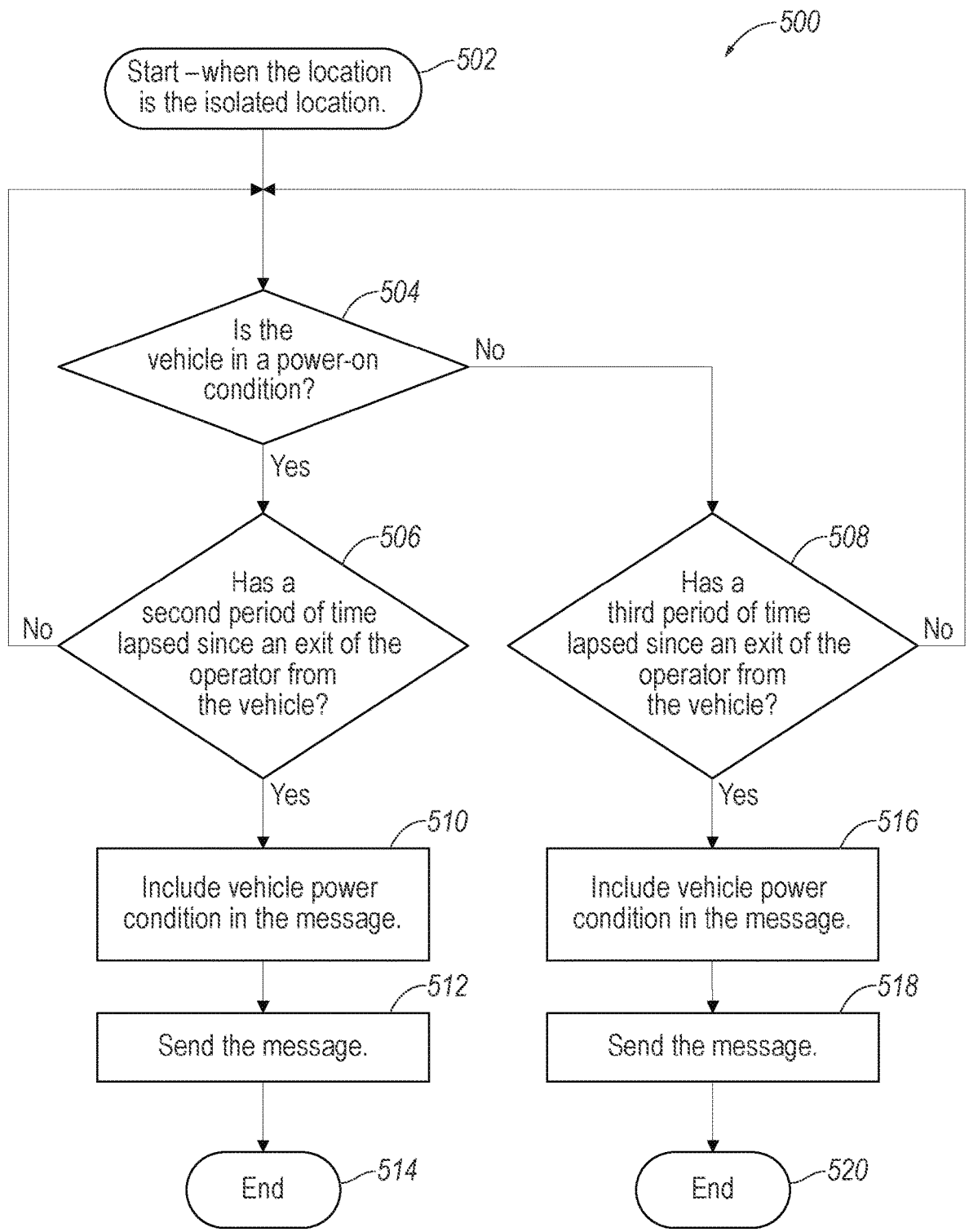
FIG. 8 is a flow chart of a supplementary process for advising of a status of a power condition of the vehicle when the vehicle is in the second type of location.

FIG. 8 is a diagram of an example supplemental process 500 to the process 200 that may be executed at any time before the message is sent out by the block 230. The process 500 is started in a block 502, and then continues to a block 504.

In the block 504, a determination is made as to whether the vehicle 102 is in a power-on condition. When it is, the process 500 continues to a block 506. When it is not, the process 500 continues to a block 508.

In the block 506, there is a determination made as to whether the second period of time has lapsed since an exit of the operator 130 from the vehicle 102. When the second period of time has not lapsed, the process 500 loops back to the block 504. When the second period of time has lapsed, the process 500 continues to a block 510.

In the block 510, the vehicle power condition is included in the message. The process continues in a block 512.

In the block 512, the message is sent. The process continues in a block 514.

In the block 514, the process 500 ends.

In the block 508, there is a determination made as to whether a third period of time has lapsed since an exit of the operator 130 from the vehicle 102. When the third period of time has not lapsed, the process 500 loops back to the block 504. When the third period of time has lapsed, the process 500 continues to a block 516.

In the block 516, the vehicle power condition is included in the message. The process continues in a block 518.

In the block 518, the message is sent. The process continues in a block 520.

In the block 520, the process 500 ends.

Figure 9:
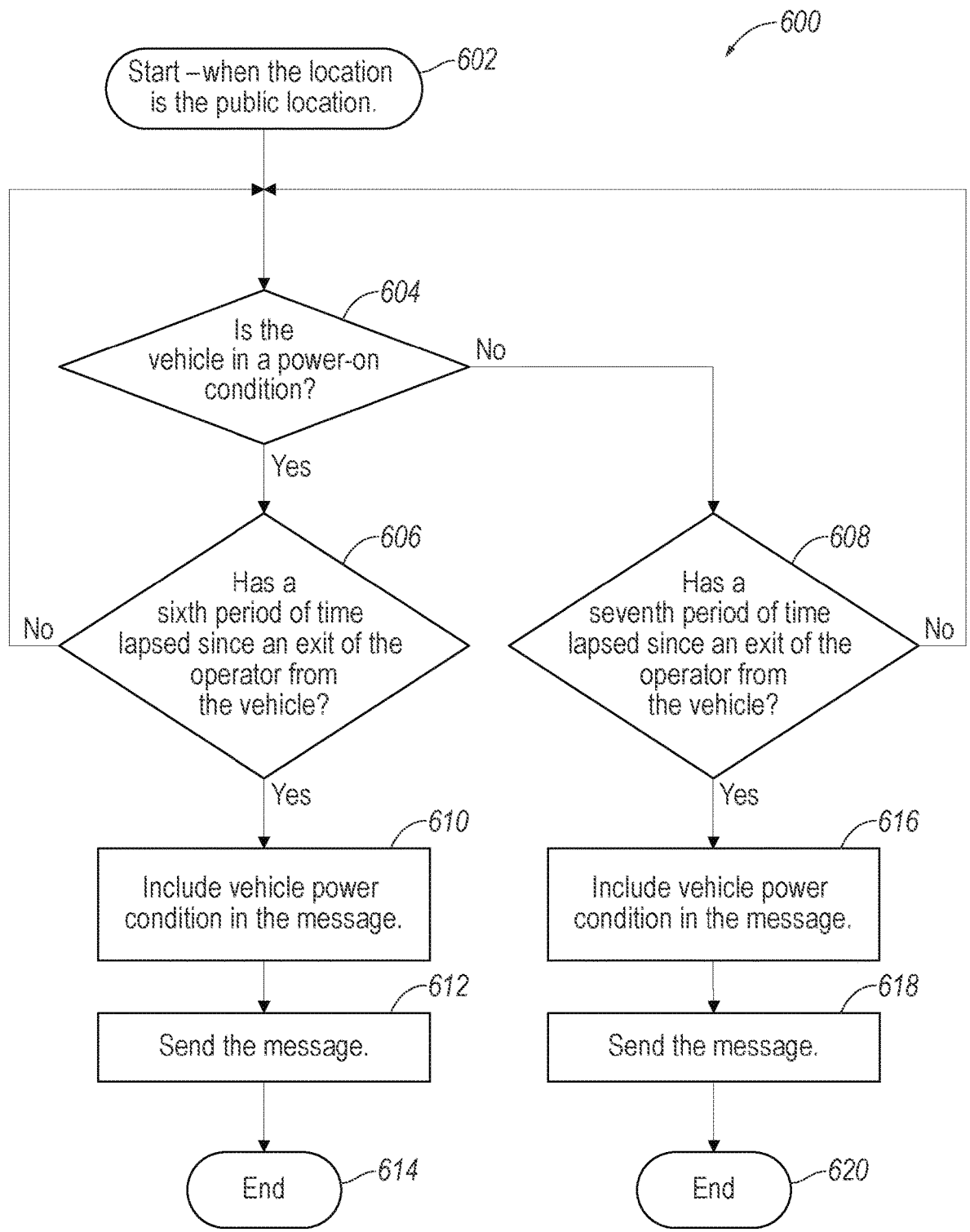
FIG. 9 is a flow chart of a supplementary process for advising of a status of a power condition of the vehicle when the vehicle is in the third type of location.

FIG. 9 is a diagram of an example supplemental process 600 to the process 200 that may be executed at any time before the message is sent out by the block 236. The process 600 is started in a block 602, and then continues to a block 604.

In the block 604, a determination is made as to whether the vehicle 102 is in a power-on condition. When it is, the process 600 continues to a block 606. When it is not, the process 600 continues to a block 608.

In the block 606, there is a determination made as to whether the sixth period of time has lapsed since an exit of the operator 130 from the vehicle 102. When the sixth period of time has not lapsed, the process 600 loops back to the block 604. When the sixth period of time has lapsed, the process 600 continues to a block 610.

In the block 610, the vehicle power condition is included in the message. The process continues in a block 612.

In the block 612, the message is sent. The process continues in a block 614.

In the block 614, the process 600 ends.

In the block 608, there is a determination made as to whether the seventh period of time has lapsed since an exit of the operator 130 from the vehicle 102. When the seventh period of time has not lapsed, the process 600 loops back to the block 604. When the seventh period of time has lapsed, the process 600 continues to a block 616.

In the block 616, the vehicle power condition is included in the message. The process continues in a block 618.

In the block 618, the message is sent. The process continues in a block 620.

In the block 620, the process 600 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, comprising a processor and a memory, wherein the memory stores instructions executable by the processor such that the computing device is programmed to:
    upon detecting that a vehicle is parked, based on data from at least one of a sensor and a component in the vehicle, determine a location of the vehicle;
    upon detecting that a vehicle operator has exited the vehicle, based on the data from at least one of a sensor and a component in the vehicle, determine if a key fob is in the vehicle; and
    upon detecting that the key fob is in the vehicle, and based on the location of the vehicle, schedule a message to a user device, wherein scheduling the message includes determining whether to schedule the message according to a timing of the message based on a type of the location, including determining whether to not send the message based upon the type of the location.

2. The computing device of claim 1, wherein the computing device is further programmed to determine the location in which the vehicle is parked to be the type of location that is one of a secure location, an isolated location, or a public location.

3. The computing device of claim 1, wherein when the location is an isolated location:
    determine persons within a recognition range as being one of an identified person and an unidentified person;

when only identified persons are detected, repeat the determination of persons with the recognition range after a first period of time; and when an unidentified person is detected, schedule and send the message to the user device.

4. The computing device of claim 1, further programmed to, when the location is a public location, schedule and send the message to the user device.

5. The computing device of claim 1, further programmed to determine whether a door lock is in a locked condition or in an unlocked condition.

6. The computing device of claim 1, further programmed to determine whether a vehicle door is in an ajar condition or in a fully closed condition.

7. The computing device of claim 1, further programmed to, when the location of the vehicle is in an isolated location and the vehicle is in a power-on condition, send the message to the user device after a first and/or second period of time after an event.

8. The computing device of claim 7, further programmed to, when the location of the vehicle is in the isolated location and the vehicle is in a power-off condition, send the message to the user device after a third period of time after detection of the event, with the third period of time being greater than the second period of time.

9. The computing device of claim 1, further programmed to, when the location of the vehicle is an isolated location and an unidentified person is detected, send the message to the user device within a fourth period of time from such detection.

10. The computing device of claim 1, further programmed to, when the location of the vehicle is a public location and the vehicle is in a power-on condition, send the message to the user device within a fifth period of time after detection of an event.

11. The computing device of claim 1, further programmed to, when the location of the vehicle is a public location and the vehicle is in a power-off condition, send the message to the user device within a sixth period of time after detection of an event.

12. The computing device of claim 1, further programmed to continuously monitor sensors for errors and when an error is detected to immediately send the message to the user device.

13. A method of responding to a detection of a vehicle key fob in a parked vehicle, the method comprising the steps of:

upon detecting that a vehicle is parked, based on data from at least one of a sensor and a component in the vehicle, determining a location of the vehicle;

upon detecting that a vehicle operator has exited the vehicle, based on the data from at least one of a sensor and a component in the vehicle, determine if a key fob is in the vehicle; and upon detecting that the key fob is in the vehicle, and based on the location of the vehicle, scheduling a message to a user device; wherein scheduling the message includes determining whether to schedule the message according to a timing of the message based on a type of the location, including determining whether to not send the message based upon the type of the location.

14. The method of claim 13, wherein scheduling the message includes determining not to send the message upon determining that the location is a secure location.

15. The method of claim 13, wherein the location in which the vehicle is parked is determined to be the type of location that is one of a secure location, an isolated location, or a public location.

16. The method of claim 13, wherein when the location is an isolated location, further comprising the steps of:

determining persons within a recognition range as being one of an identified person and an unidentified person;

when only identified persons are detected, repeating the determination of persons with the recognition range after a first period of time; and when an unidentified person is detected, scheduling and sending the message to the user device.

17. The method of claim 13, further comprising determining whether a door lock is in a locked condition or in an unlocked condition.

18. The method of claim 13, wherein, when the location of the vehicle is in an isolated location and the vehicle is in a power-on condition, sending the message to the user device after a first and/or a second period of time after an event.

19. The method of claim 18, wherein, when the location of the vehicle is in the isolated location and the vehicle is in a power-off condition, sending the message to the user device after a third period of time after detection of the event, with the third period of time being greater than the second period of time.

* * * * *